(12) United States Patent
Wenzel

(10) Patent No.: US 9,387,986 B2
(45) Date of Patent: Jul. 12, 2016

(54) CARGO AREA OF AN AIRPORT

(75) Inventor: Reinhard Wenzel, Erkrath (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 972 days.

(21) Appl. No.: 11/904,581

(22) Filed: Sep. 27, 2007

(65) Prior Publication Data

US 2008/0131243 A1 Jun. 5, 2008

(30) Foreign Application Priority Data

Sep. 29, 2006 (DE) .......................... 10 2006 046 691

(51) Int. Cl.
*B65G 1/04* (2006.01)
*B65G 63/02* (2006.01)
*B65G 63/00* (2006.01)

(52) U.S. Cl.
CPC ................ *B65G 1/04* (2013.01); *B65G 63/025* (2013.01); *B65G 63/004* (2013.01)

(58) Field of Classification Search
CPC .. B65G 1/0407; B65G 1/1378; B65G 1/1376; B65G 1/02; B65G 1/0435; B65G 1/06; B65G 1/0442; B65G 1/1371; B65G 1/04; B65G 63/004; B65G 67/04; B65G 57/20; B65G 67/24; B65G 57/02; B65G 47/261; B65G 1/026; B65G 1/0414; B65G 1/0471; B65G 1/0492; B65G 1/10; B65G 63/002; B65G 63/022; B65G 63/025; B65G 69/001; A24B 1/08; B63C 15/00; G11B 17/225; G11B 15/6835; B27N 3/22; B66F 9/07; B66F 9/141; B66F 9/12; B07C 3/02; B64F 1/32; B65D 88/32

USPC ............. 414/266, 267, 278, 282, 285, 749.5, 414/785, 344; 198/347.1, 347.4

See application file for complete search history.

(56) References Cited

U.S. PATENT DOCUMENTS

| | | | | | |
|---|---|---|---|---|---|
| 2,387,527 | A | * | 10/1945 | Nagamatsu | 244/118.2 |
| 2,815,871 | A | * | 12/1957 | Kingsley | 414/285 |
| 3,136,433 | A | * | 6/1964 | Inghram | 414/391 |
| 3,263,832 | A | * | 8/1966 | Williams, Jr. et al. | 414/344 |
| 3,379,321 | A | * | 4/1968 | Weir | 414/281 |
| 3,554,470 | A | * | 1/1971 | Dudley | 244/114 R |

(Continued)

FOREIGN PATENT DOCUMENTS

| | | |
|---|---|---|
| DE | 29724039 U1 | 9/1999 |
| DE | 10150915 A1 | 4/2003 |
| EP | 1331179 A1 | 7/2003 |

*Primary Examiner* — Glenn Myers
(74) *Attorney, Agent, or Firm* — Laurence Greenberg; Werner Stemer; Ralph Locher

(57) ABSTRACT

The invention relates to the cargo area of an airport, having transporting paths which connect the land side and the air side of the airport and are intended for the standard loading units (ULDs), and also having interim stores for the buffer storage of the loading units prior to the cargo being assembled. In order to create storage and sorting opportunities in the immediate vicinity of the transporting paths, while being simultaneously independent of the main store, and in order to achieve flexible supply of the loading units, it is proposed for the transporting paths to be assigned vertical stores each with a plurality of storage levels which are arranged one above the other, are set up above or alongside the transporting paths and in which, with the aid of lifting means, the loading units, which can be lifted off from the transporting paths, can be stored.

7 Claims, 4 Drawing Sheets

(56) References Cited

U.S. PATENT DOCUMENTS

| | | | |
|---|---|---|---|
| 3,568,862 A * | 3/1971 | Walkhoff et al. | 414/285 |
| 3,613,910 A * | 10/1971 | Weir | 414/281 |
| 3,727,581 A * | 4/1973 | Brent | 119/453 |
| 3,792,785 A * | 2/1974 | Weir | 414/278 |
| 3,981,464 A * | 9/1976 | Dudley | 244/114 R |
| 4,103,787 A * | 8/1978 | Salloum | 414/276 |
| 4,218,034 A * | 8/1980 | Magill | 244/114 R |
| 4,773,807 A * | 9/1988 | Kroll et al. | 414/282 |
| 5,350,050 A * | 9/1994 | Franke | 198/347.1 |
| 5,953,234 A * | 9/1999 | Singer et al. | 700/214 |
| 6,129,026 A * | 10/2000 | LeCroy | 104/88.01 |
| 6,164,892 A * | 12/2000 | Malloy et al. | 414/398 |
| 6,223,887 B1 * | 5/2001 | Andou | 198/468.1 |
| 6,321,138 B1 * | 11/2001 | Livesay et al. | 700/245 |
| 6,591,961 B2 * | 7/2003 | Fukushima | 198/346.2 |
| 6,784,391 B2 * | 8/2004 | Takizawa | 209/583 |
| 6,874,735 B1 * | 4/2005 | Audyli | 244/137.1 |
| 7,575,197 B2 * | 8/2009 | McCoskey et al. | 244/137.1 |
| 7,991,653 B2 * | 8/2011 | Factor et al. | 705/28 |
| 8,172,183 B2 * | 5/2012 | Erben et al. | 244/137.1 |
| 2002/0159869 A1 * | 10/2002 | Fukuhara et al. | 414/398 |
| 2004/0197171 A1 * | 10/2004 | Freudelsperger | 414/281 |
| 2007/0025832 A1 * | 2/2007 | Rawdon et al. | 414/401 |

\* cited by examiner

CARGO AREA OF AN AIRPORT

CROSS REFERENCE TO RELATED APPLICATIONS

This application claims priority of German Patent application No. 10 2006 046 691.8 filed Sep. 29, 2006, which is incorporated by reference herein in its entirety.

FIELD OF INVENTION

The invention relates to the cargo area of an airport, having a land side for connecting to the road and/or railroad and having an air side for connecting to the apron of the airport, and having transporting paths which connect the two sides and are intended for the standard loading units (ULDs) which are to be transported between the land side and air side, and also having interim stores for the buffer storage of the loading units within the cargo area prior to the cargo which is to be assigned to an aircraft or a vehicle in a desired order being assembled.

BACKGROUND OF THE INVENTION

In cargo areas of airports, goods are handled in so-called ULDs, which is the term used to refer to the standard transporting containers, these advantageously being adapted three-dimensionally to the profile of the fuselage. The goods are usually delivered on the land side, via entry gates, at which trucks or railroad cars dock. The goods are then transported in the ULDs, via bypass conveyors (conveying paths), to the other side of the cargo area, where they are kept on standby on the air side, in the vicinity of the apron of the airport. The same likewise applies in reverse, when ULDs are flown in with freight and have to be distributed to the appropriate trucks or railroad cars in order to be transported further. In conventional airport cargo areas, it is not possible, as a result of the usually simple design of the bypass conveyor, for the transporting paths to be used simultaneously for transporting the ULDs in both directions.

Although the goods are often delivered in correspondence with their loading times (just in time), it is often not possible to synchronize delivery and further transportation. Examples of reasons for this are that the aircraft is late or the supply conveyors are already occupied by other assembled orders. In such a case, most of the ULDs, prior to being loaded into the vehicle or aircraft, have to be introduced into a ULD store, where they are buffer-stored. In reality, it is therefore the case that even ULDs which are definitely going to be needed very shortly nevertheless have to be introduced into the main ULD store, with high outlay, with the aid of elevating transfer vehicles (ETVs) or monorail equipment. This operation is imperative in order for the transporting paths, on which buffer storage, but no sorting, is possible, to be kept free for subsequent consignments of cargo.

SUMMARY OF INVENTION

Taking as the departure point the abovedescribed disadvantages of current cargo areas, the object of the present invention is to create storage and sorting opportunities in the immediate vicinity of the transporting paths, while being simultaneously independent of the main store, in order to achieve flexible supply.

In order to achieve the object, the invention proposes that the transporting paths are directly assigned vertical stores each with a plurality of storage levels which are arranged one above the other, are set up above or alongside the transporting paths and in which, with the aid of lifting means, the cargo carriers, which can be lifted off from the transporting paths, can be stored. The vertical stores assigned to the transporting paths avoid high-outlay storage in the main store and allow very quick access to the cargo carriers buffer-stored there, along with simultaneous sorting opportunities.

It is considered to be particularly advantageous if, according to one configuration of the invention, the vertical stores can be isolated from the conveying flow of the loading units. This is because this isolation makes it possible to keep the transporting paths free of any loading units which are to be stored, in which case subsequent and preferential orders can be transported past the buffer-stored loading units and it is even possible for transporting paths to be used in both directions.

In an advantageous configuration of the invention, it is proposed that the transporting paths are guided transversely or longitudinally through the vertical stores. The vertical stores, with their storage levels arranged one above the other, would thus span the transporting path, the lowermost level being kept free for the loading units to pass through. The proximity of the vertical store to the transporting path allows extremely quick storage and retrieval; as soon as a loading unit has been stored, the transporting path is free for transporting further loading units.

According to the invention, the lifting means engage beneath the loading units resting on the transporting paths. The lifting means are configured, for example, as lifts and transport the goods from the transporting path to the appropriate storage level and discharge them there for temporary storage.

It is particularly advantageous if the storage levels of a vertical store are provided on both sides of the lifting means, which is arranged centrally in the vertical store, and the lifting means is assigned means for transferring the loading units into, and receiving the loading units from, the storage levels on both sides of the vertical store. Storage and retrieval can thus take place in both directions of the lifting means, as a result of which a large storage capacity can be achieved with one and the same lifting means.

It is advantageous if the rack levels, which are arranged on both sides of a lifting means, are dimensioned differently for receiving cargo carriers of different sizes, the lifting means being dimensioned to correspond to the largest cargo carrier for storage and retrieval. It is thus possible, for example, for one side of the vertical store to be designed for 15-ft cargo carriers and for the other side of the store to be designed for 10-ft cargo carriers, while the lifting means is configured as a standard 15-ft apparatus. Double-depth storage, for example of two or three 5-ft cargo carriers in a storage level of corresponding size, is also possible.

According to a further advantageous feature of the invention, it is provided that the vertical stores are set up laterally alongside the transporting path and in each case one transverse transporting path, which runs in the plane of the transporting path, extends at least into the vertical store, into the region of the lifting means. In this case, the transporting path passes the vertical stores set up to its side. If a cargo carrier is to be introduced into the store, then it is discharged transversely and laterally from the transporting path onto the transverse transporting path, which transports the cargo carrier to the bottom level of the vertical store. There, the lifting means receives the cargo carrier for storage, lifts it to the appropriate storage level and sets it down there for buffer storage. This operation of the cargo carrier being discharged laterally can take place toward both sides of the transporting path if the vertical stores are set up on both sides of the transporting path.

If, according to another feature of the invention, the transverse transporting path passes through the vertical store at the lowermost level and, on the side which is directed away from the transporting path, allows coupling for vehicles or further transportation of the loading unit to a further station, then cargo carriers which are to be discharged rather than stored can be transported through the vertical store and transferred, for example, to a truck. It is also conceivable for cargo carriers which have been stored, but are not to be fed back to the transporting path, to be discharged there. Of course, it is also conceivable to extend the transverse transporting path and to feed cargo carriers from there to some other intended location.

In a variant of the invention, it is proposed to set up a vertical store between two transporting paths and charge it from both transporting paths, via transverse transporting paths. This solution uses two parallel transporting paths, of which, for example, one can be kept for forward transportation and one can be kept for return transportation, while the interim store can be used for both transporting directions.

In a further advantageous configuration of the invention, it is provided that the storage levels, which are arranged one above the other, are provided on at least three sides of the lifting means, the lowermost storage level at least on one side of the vertical store remaining free. The lifting means, as central element of the vertical store, can unload loading units to the two opposite sides, and receive loading units from these sides, but it can also displace loading units transversely thereto, to a third side of the lifting means, or receive them from there, if loading or unloading takes place at the lowermost storage level.

The invention even makes it possible for setting up a vertical store between two transporting paths to allow introduction into the storage levels, in the x and z directions, on three to four sides, in which case the introduction, which takes place transversely to the transporting direction, takes place on storage levels which are arranged on the respectively second to nth level above the transporting paths. Storage and retrieval of the loading units, then, takes place in a crosswise manner on the individual horizontal levels, the loading units being set down on the lifting means on the lowermost level.

The lifting means may be of fairly straightforward configuration, for example it may be designed as a roller deck. The interim stores according to the invention are advantageously arranged as buffer stores in the cargo area in the vicinity of the apron and/or in the vicinity of the road/railroad, and are filled such that sorting of the loading units takes place in the vicinity of the region where the loading units are picked up for shipping purposes.

If a vertical store of the type according to the invention is set up in the vicinity of the apron, where space for keeping freight is very limited in any case, the loading units which are necessary for preparing a cargo aircraft for takeoff can be quickly made available without the ETVs and/or monorail equipment being unnecessarily monopolized.

Overall, the invention is advantageous because it speeds up the storage and retrieval process, and renders the same flexible, since, rather than the loading units having to be buffer-stored on the transporting paths, where they block other loading units, the loading units can be buffer-stored in the vicinity of their retrieval location and can even be picked up again in the correct, different order.

BRIEF DESCRIPTION OF THE DRAWINGS

An exemplary embodiment of the invention is described hereinbelow and is illustrated in the drawing, in which.

DETAILED DESCRIPTION OF INVENTION

Figure 1:
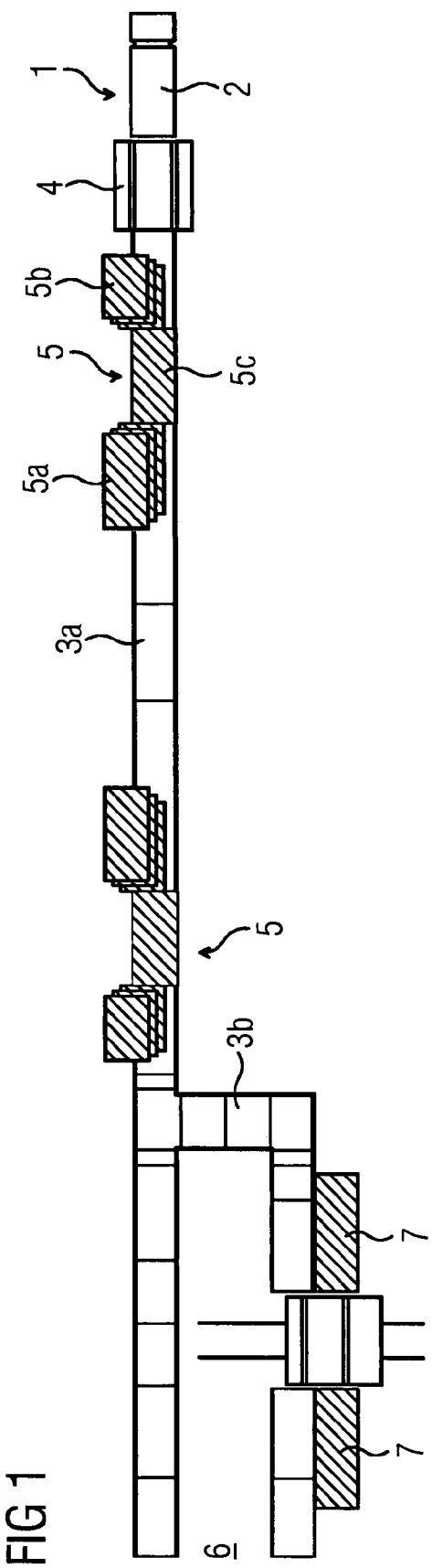
FIG. 1 shows, in plan view, the schematic illustration of an airport cargo area according to the invention.

In the roughly schematic illustration of FIG. 1, 1 designates the land side of an airport, where trucks 2 deliver their cargo for further transportation on a transporting path 3a, for example a roller conveyor. Provided directly in the truck-unloading area is an arrangement for weighing and measuring the loading unit, which is usually constituted by so-called ULDs, which are standard containers for receiving the goods which are to be transported. The measuring apparatus is designated by 4. Immediately following the measuring apparatus 4 in FIG. 1 is a first vertical store 5, of which the lowermost level has the transporting path 3a running through it. This first vertical store 5 preferably serves for storing storage units which, coming from the air side, are intended for retrieval on the land side, and are thus buffer-stored in the vicinity of the truck-loading area in order to be capable of being loaded quickly. The vertical store comprises a plurality of storage levels 5a, 5b which are arranged one above the other on both sides of a lifting means 5c. The lifting means 5c receives the loading unit from the transporting path 3a and lifts it vertically into alignment with one of a number of storage levels 5a, 5b arranged one above the other, and stores it there.

A second vertical store 5 is provided further along the transporting path 3a, in the vicinity of the air side; this vertical store, too, serves for the interim or buffer storage of loading units in the vicinity of the location where they are required. Accordingly, the loading units buffer-stored there are preferably ones which, coming from the land side, are to be loaded promptly into the aircraft. The main store 7 is thus relieved, and the access times are reduced.

By virtue of the loading units being stored on the various storage levels, the order selected for storage purposes can be changed upon retrieval, in which sorting of the stored loading units is possible. Following retrieval, the loading units are set down in the plane of the conveying path and moved directly, via the latter, to the loading locations on the air side 6.

That arrangement of the vertical stores along the transporting paths which is illustrated in FIG. 1 allows very flexible operation because, since the loading units can be removed by the transporting paths 3a and moved into the interim stores, the transporting paths are not just free for subsequent loading units, but can also be used in both directions.

Figure 2:
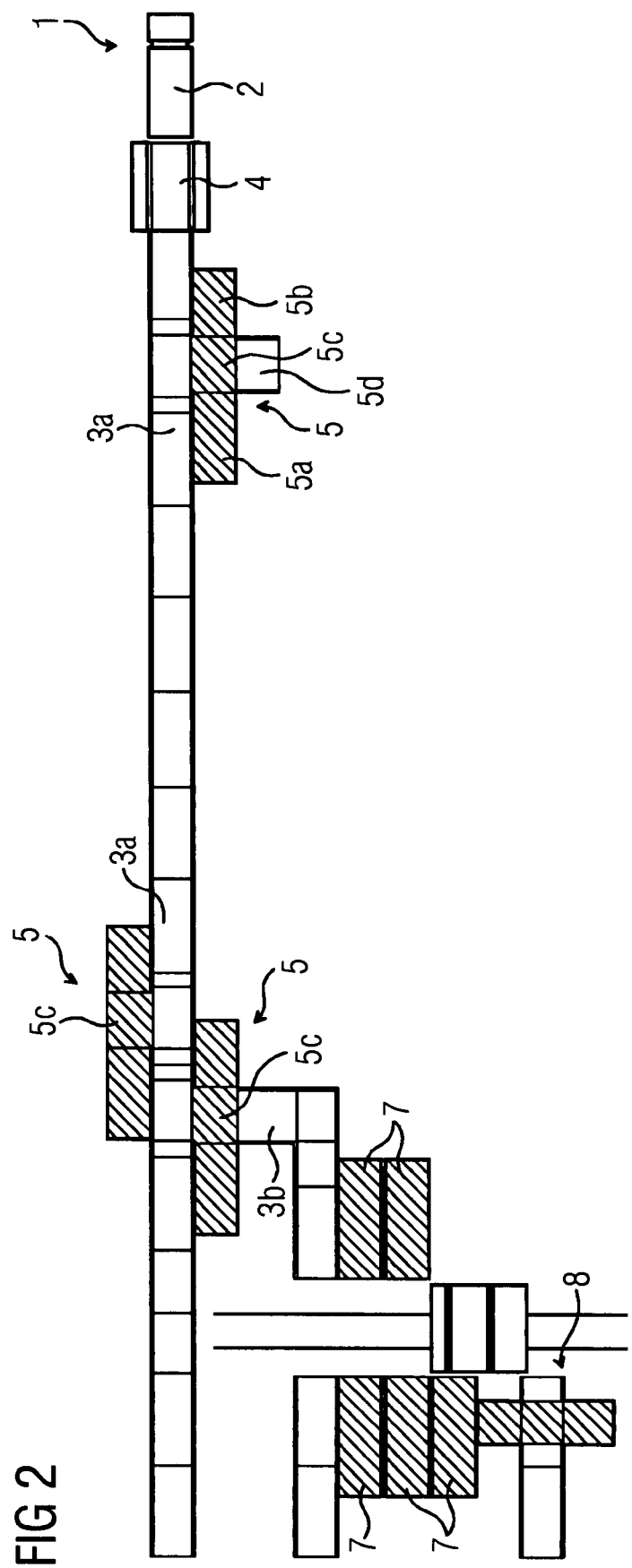
FIG. 2 shows a second variant of the cargo area according to the invention.

Another variant of a cargo area of an airport is illustrated, likewise schematically in plan view, in FIG. 2. The loading units unloaded from the truck 2 are first of all measured and weighed at 4 and then passed onto the conveying path 3a. It is also the case in this example that a vertical store 5 according to the invention is provided in the vicinity of the land side, alongside the conveying path 3a, this vertical store likewise comprising storage levels 5a, 5b which are arranged one above the other on both sides of the lifting means 5c, and serving for keeping on standby the loading units which come from the air side and are to be loaded promptly into the truck.

As can be seen, as is also illustrated in FIG. 1, that side of the vertical store 5 which is provided with the storage levels 5a is envisaged for the storage of relatively large containers (e.g. 15 ft), while the side with the storage levels 5b is configured for smaller containers (e.g. 10 ft). Here too, multiple-depth storage is conceivable and possible. The loading unit transported up from the truck 2 via the transporting path 3a can be transferred by transverse displacement into the apron-side vertical store 5, where it is lifted to the respective storage level by the lifting means 5c for temporary storage in the vicinity of the air side.

As can be seen in the left-hand half of FIG. 2, the vertical stores 5 are arranged on both sides of the transporting path 3a in order additionally to increase the storage capacity. A short transverse conveyor here projects in each case into the region of the lifting means of the vertical stores, as can be seen from the vertical store at the top (of the drawing) or else a transverse conveying path 3b passes through the vertical store 5 and provides a link to the main store 7. It is thus possible for loading units which are to be promptly retrieved to be removed from the main store 7 and, fed via the transverse transporting path 3b, kept on standby in the interim store which is at the bottom (of the drawing). Upon request, these loading units can be discharged onto the transporting path 3a and transported directly, and very quickly, to the air side (on the left-hand side of the drawing).

It is also possible, as illustrated at 8, to set up a vertical store of the above-mentioned construction directly on the, or in the vicinity of the, apron, in order for the latter likewise to be used for interim storage. Overall, on the one hand, this results in a high storage capacity in the apron area and, on the other hand, it allows the transfer vehicle 9 to be independent of the operation of picking up the loading units.

Figure 3:
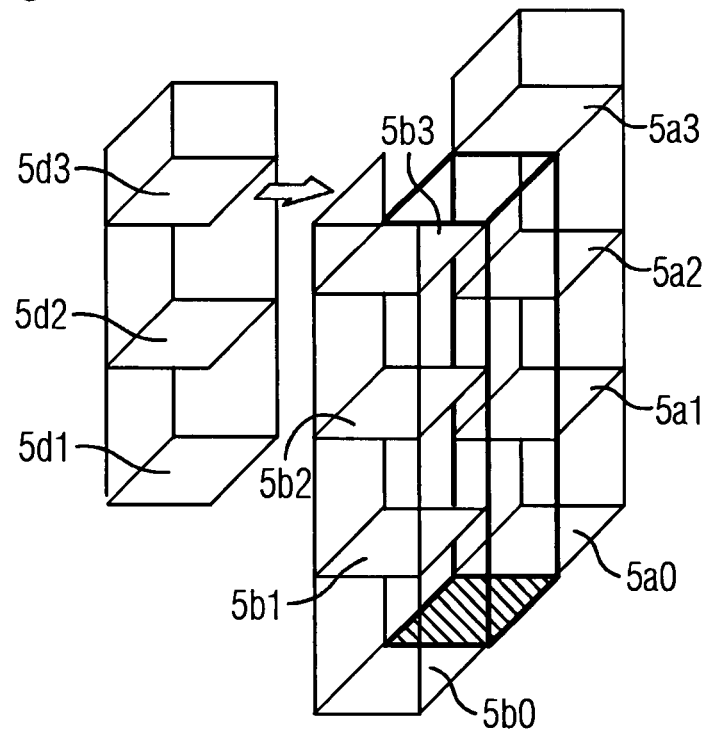
FIG. 3 shows a three-dimensional illustration of a vertical store according to the invention.

FIG. 3 shows a schematic, three-dimensional illustration of a vertical store of the invention which, in this case, comprises four storage levels on two sides of the lifting means. The storage levels are designated by 5a0-5a3 and 5b0-5b3; they are arranged on both sides of the lifting means 5c. The lifting means 5c is arranged on the storage level 5a0; the loading unit can be pushed laterally into the vertical store in order to be able to be raised to the respective storage levels 5a or 5b.

As can be seen on the left-hand side of FIG. 3, the storage capacity of the vertical store 5 can be increased by additional loading levels being fitted on the (depicted) rear side of the vertical store 5. In this case, provision is made for the lowermost loading level 5d0 to be kept free in order to allow the loading unit to be moved out to the rear side of the vertical store. The additionally created storage levels are designated by 5d1, 5d2 and 5d3. They are fitted on the vertical store 5 in the direction of the arrow, and fastened there.

Figure 4:
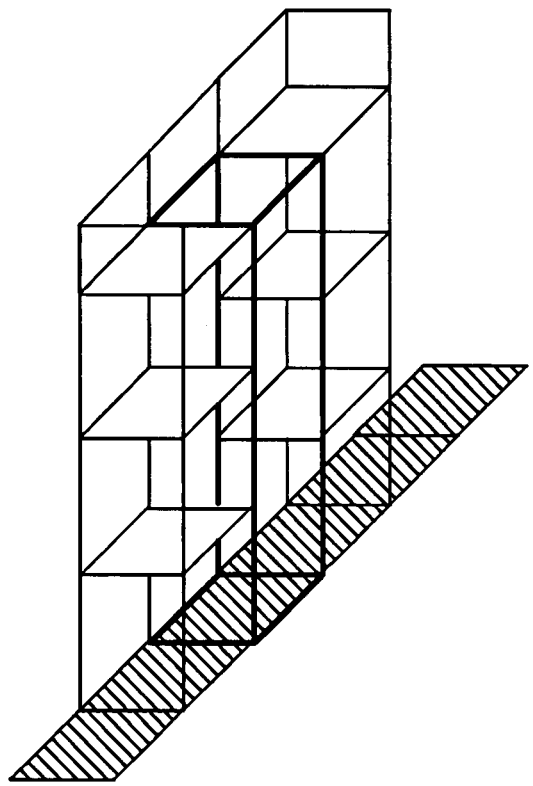
FIG. 4 shows a variant of a vertical store according to the invention.

FIG. 4 shows a variant of the vertical store 5 in which the conveying path 3a passes through the vertical store 5 entirely along the bottom level. In the case of this advantageous solution, the loading units transported into the vertical store can be received directly by the lifting means and transported upwards to the respective loading level. Advantages here are quick access times and short transporting distances.

Figure 5:
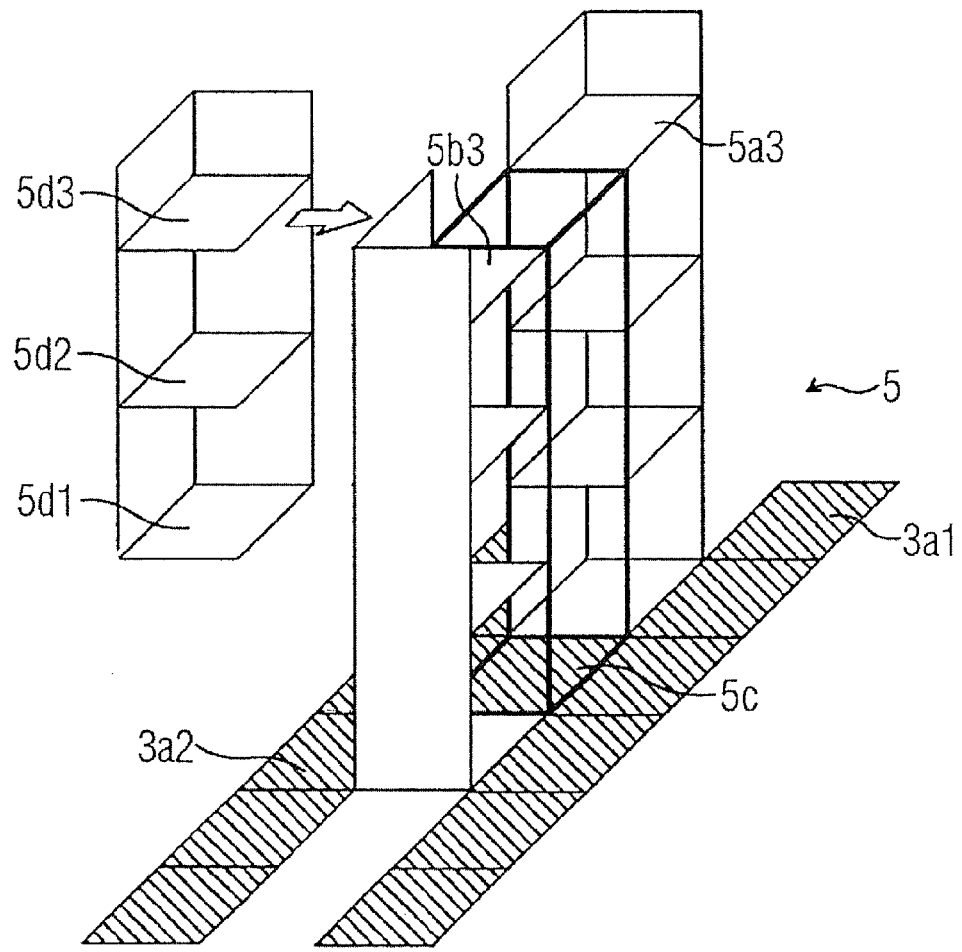
FIG. 5 shows a vertical store between two transporting paths.
Figure 6:
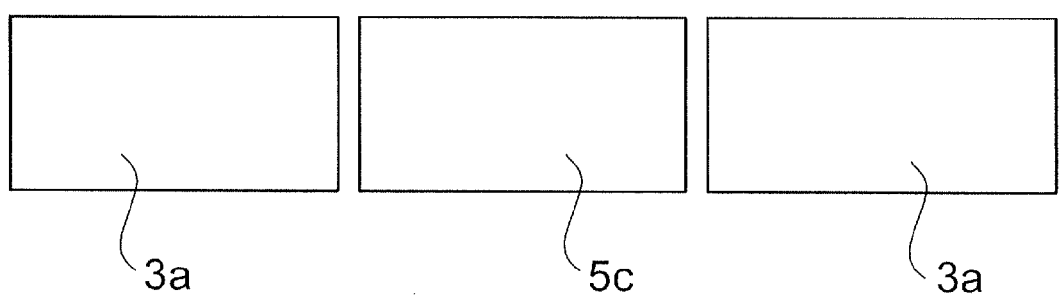
FIG. 6 shows a schematic illustration of a roller deck as a lifting device.

FIG. 5 illustrates a configuration of the invention in which a vertical store is arranged between two transporting paths 3a1 and 3a2. By virtue of a loading unit being transported transversely from one of the transporting paths 3a1 or 3a2 a cargo carrier is transferred onto the lifting means 5c and lifted, by the latter, to the respective storage level and stored there. As described with reference to FIG. 3, it is also possible to create the storage capacity here by additional storage levels being fitted laterally on the vertical store, in which case storage and retrieval of the loading units can take place in three directions. Of course, it is also possible for the fourth side of the vertical store 5 likewise to be provided with additional loading levels; the only requirement here is for the lowermost level of the vertical store to remain free for storage and retrieval of the loading units. FIG. 6 provides a schematic illustration of a portion of the transporting path 3a which includes the lifting means 5c embodied as a rolling deck. The transporting path 3a transports cargo generally horizontally. The rolling deck is schematically illustrated by the vertical arrow of FIG. 6, since it receives cargo horizontally from the transporting path 3a and either passes it along horizontally or lifts it vertically to the respective storage level.

The present invention is very flexible; it allows the interim storage of loading units and a very flexible supply, while being simultaneously independent of, and therefore relieving, the main store, in which, up until now, the loading units had to be stored even if they were needed quickly. Introducing the loading units into the interim store keeps the transporting path free for other loading units and allows the land side and air side to be connected directly in both directions. The capacities of the vertical stores are variable and depend on the size and number of storage levels. In either arrangement, both above the transporting path and immediately alongside the transporting path, the retrieval distances are kept very short, in which case quick access to the loading units is possible. This is the case in particular when vertical stores are provided in the vicinity of the land side, that is to say where the trucks are loaded, for the loading units which are to be loaded into the truck or when the vertical stores are provided in the vicinity of the apron, where the goods are to be kept on standby for the purpose of loading the aircraft.

The invention claimed is:

1. A cargo area of an airport, comprising:
a transporting path;
a transverse transporting path connected to the transporting path;
a land side for connecting to a road and/or railroad, the land side including a first area for loading and unloading;
an air side for connecting to an apron of the airport, the air side including a second area for loading and unloading;
a main store located in the cargo area of the airport and connected to the transporting path by the transverse transporting path;
the transporting path bypassing the main store and is being provided for transporting a plurality of aircraft loading units directly from the land side to the air side and directly from the air side to the land side;
interim vertical stores each being distinct from the main store and having storage levels, each interim vertical store including a plurality of storage levels arranged one above the other and each interim vertical store including a lifting device, the lifting device lifting the aircraft loading units from the transporting path onto an assigned storage level of a respective interim vertical store for storage;
the lifting devices being arranged centrally in the interim vertical stores such that the storage levels of the interim vertical stores are arranged on opposite sides of the lifting devices, and the lifting devices each including a transferring capability, the transferring capability configured for transferring the aircraft loading units into the storage levels on either side of the lifting devices and for receiving the aircraft loading units from the storage levels on the either side of the lifting devices;
the interim vertical stores being arranged above and alongside the transporting path;

the interim vertical stores providing buffer storage of the aircraft loading units within the cargo area of the airport prior to assembling cargo to be assigned to an aircraft or a vehicle in a desired order;

the main store being configured for storing aircraft loading units for a longer period of time than the interim vertical stores; and the main store being provided for storing a further plurality of aircraft loading units.

2. The cargo area as claimed in claim 1, wherein the lifting devices engage beneath at least one of the aircraft loading units resting on the transporting path.

3. The cargo area as claimed in claim 1, wherein the storage levels arranged on the opposite sides of the lifting devices, are dimensioned differently for receiving aircraft loading units of different sizes or a plurality of small aircraft loading units, the lifting devices being dimensioned to correspond to the largest aircraft loading units for storage and retrieval.

4. The cargo area as claimed in claim 1,
wherein the transporting path passes through the interim vertical stores at a lowermost level.

5. The cargo area as claimed in claim 1,
wherein the lifting devices are roller decks.

6. The cargo area as claimed in claim 1,
wherein a plurality of the interim vertical stores are arranged as buffer stores in the cargo area in a vicinity of the apron and/or the road/railroad.

7. The cargo area as claimed in claim 1,
wherein the lifting devices are cargo carriers.

\* \* \* \* \*